United States Patent
Yamamoto et al.

(10) Patent No.: US 8,740,441 B2
(45) Date of Patent: Jun. 3, 2014

(54) BACKLIGHT UNIT AND IMAGE DISPLAY USING THE SAME

(75) Inventors: Shoji Yamamoto, Fujisawa (JP); Satoshi Ouchi, Kamakura (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 194 days.

(21) Appl. No.: 13/301,832

(22) Filed: Nov. 22, 2011

(65) Prior Publication Data

US 2012/0140447 A1    Jun. 7, 2012

(30) Foreign Application Priority Data

Dec. 3, 2010    (JP) .................................. 2010-269881

(51) Int. Cl.
G02F 1/13357    (2006.01)

(52) U.S. Cl.
USPC ............. 362/615; 362/610; 362/623; 349/62; 349/65

(58) Field of Classification Search
USPC ........... 362/97.2, 615, 610, 613, 623; 349/62, 349/65, 63
See application file for complete search history.

(56) References Cited

U.S. PATENT DOCUMENTS

| | | |
|---|---|---|
| 2007/0247871 A1 | 10/2007 | Yoo |
| 2008/0030650 A1 | 2/2008 | Kitagawa et al. |
| 2008/0129927 A1 | 6/2008 | Hamada et al. |
| 2009/0290093 A1 | 11/2009 | Shimura et al. |
| 2009/0303410 A1 | 12/2009 | Murata et al. |
| 2011/0109836 A1* | 5/2011 | Tanaka et al. ................... 349/61 |

FOREIGN PATENT DOCUMENTS

| | | |
|---|---|---|
| JP | 2003-021727 | 1/2003 |
| JP | A-2003-021727 | 1/2003 |
| JP | 2004-127931 | 4/2004 |
| JP | 2006-156324 | 6/2006 |
| JP | A-2006-156324 | 6/2006 |
| JP | 2007-227286 | 9/2007 |
| JP | A-2007-227286 | 9/2007 |
| JP | 2007-293339 | 11/2007 |
| JP | 2007-329114 | 12/2007 |
| JP | A-2007-329114 | 12/2007 |
| JP | 2008-34372 | 2/2008 |
| JP | 2009-283419 | 12/2009 |
| JP | A-2009/283419 | 12/2009 |
| JP | 2010-021131 | 1/2010 |
| JP | 2010-157464 | 7/2010 |
| JP | A-2010-157464 | 7/2010 |
| WO | WO 2010004801 A1 * | 1/2010 |
| WO | WO 2010/038519 | 4/2010 |

OTHER PUBLICATIONS

Office Action in corresponding Japanese Application No. 2010-269881, dated Dec. 3, 2013, with partial English language translation thereof.

* cited by examiner

*Primary Examiner* — Karabi Guharay
(74) *Attorney, Agent, or Firm* — Antonelli, Terry, Stout & Kraus, LLP.

(57) ABSTRACT

A backlight unit includes light emitting diodes (LED's) and light guide plate which guides light from the light emitting diodes to liquid crystal panel and is constructed so that light is emitted from light emission plane of light guide plate opposite to liquid crystal panel toward liquid crystal panel. Area of light emission plane of light guide plate is smaller than effective display area of liquid crystal panel and predetermined shape for diffusing or dispersing light is formed on a lateral side perpendicular to light emission plane of light guide plate and/or at an edge portion near the lateral side of the light emission plane.

14 Claims, 5 Drawing Sheets

BACKLIGHT UNIT AND IMAGE DISPLAY USING THE SAME

INCORPORATION BY REFERENCE

The present application claims priority from Japanese application JP2010-269881 filed on Dec. 3, 2010, the content of which is hereby incorporated by reference into this application.

BACKGROUND OF THE INVENTION

The present invention relates to a backlight unit using, for example, light emitting diodes (LED's) as light source for illuminating a liquid crystal panel and an image display using the same and more particularly to a backlight unit including light guide plate for guiding light from the light emitting diodes to liquid crystal panel and an image display using the same.

In order to conform to regulations of energy saving in recent years, even a backlight unit used in an image display using liquid crystal panel is required to reduce power consumption. Accordingly, area control (also named area dimming or local dimming) in which a backlight unit is divided into plural blocks and intensity of light emitted from each block is controlled in accordance with brightness of image corresponding to each block is put to practical use.

On the other hand, the edge-light type backlight unit known as one system of backlight unit converts point light from light emitting diodes into surface light by means of plate-like light guide plate made of transparent resin to irradiate liquid crystal panel with surface light, so that it is advantageous to make image display thinner (reduction in depth).

JP-A-2007-293339 (US2007/0247871) and JP-A-2010-021131 (US2009/0303410), for example, are known as prior arts of performing area dimming in the edge-light type backlight unit. These prior arts disclose that plural blocks each including light emitting diodes and light guide plate combined in a set are arranged and light intensity of light emitting diodes corresponding to each block is controlled individually to make light dimming.

SUMMARY OF THE INVENTION

Now, image displays having various display sizes (substantially equal to effective display area of liquid crystal panel) such as 22, 37, 40, 46, 52 and 60 inches are on the market. The display size of image display is hereinafter named "inch size". Problems in case where light guide plate is provided in a corresponding manner to each inch size are described below. Hereinafter, part of light guide plate of the block constructed by the set composed of light emitting diodes and light guide plate is named light guide plate block and one block is a minimum unit in which light intensity in area dimming is controlled.

Figure 8:
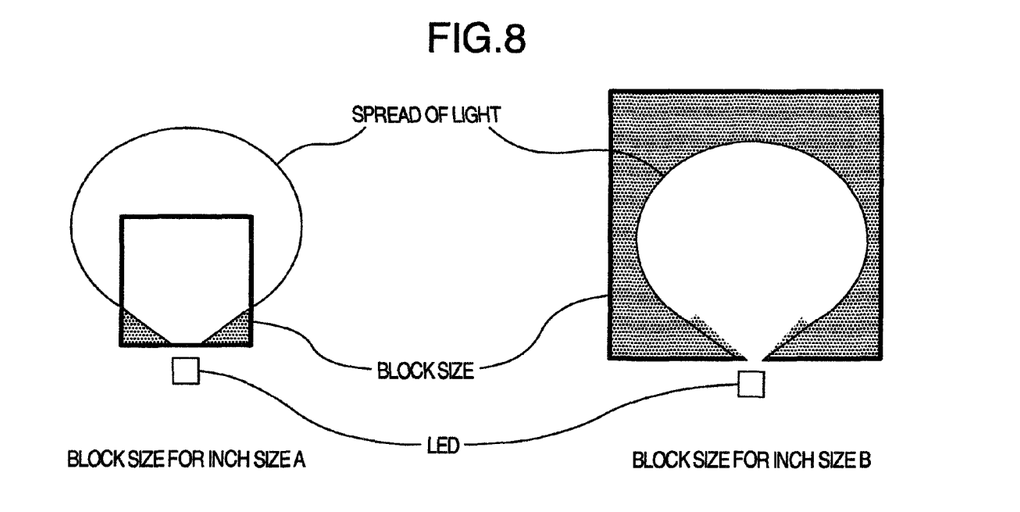
FIG. 8 is a diagram showing influence at the time that block size of light guide plate is changed.

Referring first to FIG. 8, problem in case where light guide plate block of inch size A is applied to inch size B is described. Hereinafter, light guide plate of one whole backlight unit constructed by combining plural light guide plate blocks is merely named "light guide plate". Furthermore, application of light guide plate block for a certain inch size to another inch size is also sometimes named "size development".

FIG. 8 shows influence at the time that size of light guide plate block is changed. When size of light guide plate block is changed in case where the inch size development is performed, light distribution in block size of light emitting diodes is also varied. Accordingly, luminous intensity distribution characteristic of light guide plate block size for inch size A cannot be applied to luminous intensity distribution characteristic for inch size B. Hence, when size of light guide plate block is changed, it is necessary to adjust light amount of light emitting diodes so that optimum luminous intensity distribution characteristic is obtained in accordance with each inch size (including adjustment of the number of light emitting diodes and space in arrangement of light emitting diodes in accordance with each light guide plate block) and further to adjust control algorithm for area dimming. When light amount of light emitting diodes and control algorithm are adjusted for each inch size, huge development term and cost are required.

Figure 9:
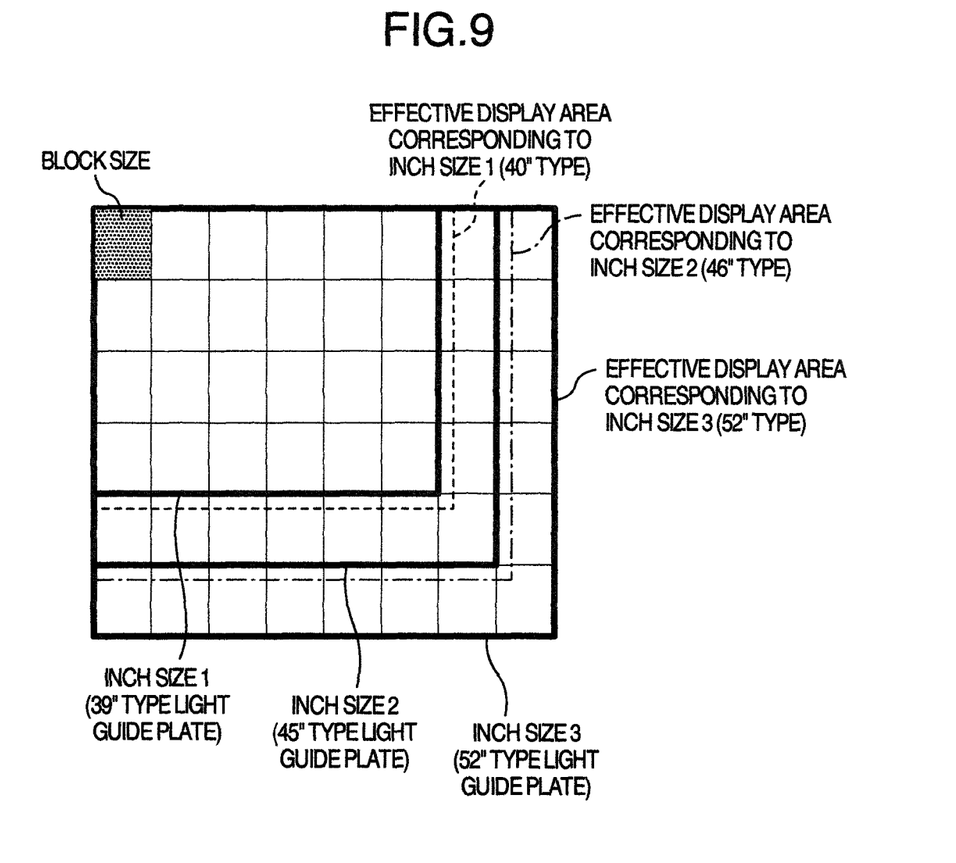
FIG. 9 is a diagram showing influence at the time that block size is not changed.

Referring now to FIG. 9, problem in case where block size is not changed is described.

FIG. 9 shows influence in case where size of light guide plate block is not changed. Description is made by taking the case where size of light guide plate block is decided on condition that effective display area (52 inches) of liquid crystal panel and size (52 inches) of light guide plate are equal to each other in inch size 3 (52 inches, for example) as an example. When light guide plate block for inch size 3 (52 inches) is applied to inch size 1 (40 inches, for example) and inch size 2 (46 inches, for example) as it is without changing size thereof, light guide plates corresponding to inch sizes 1 and 2 are smaller than effective display areas of general-purpose liquid crystal panel for inch sizes 1 and 2. Accordingly, in this case, since the edge portion of effective display area of liquid crystal panel is not irradiated with light, unevenness in brightness (that is, reduction in brightness) occurs at the edge portion and picture quality is deteriorated. That is, when light guide plate block for a certain inch size is applied to another inch size without changing size thereof as shown in FIG. 9, development term and cost in size development can be reduced greatly but it is necessary to reduce unevenness in brightness at the edge portion of effective display area.

It is an object of the present invention to provide technique capable of reducing unevenness in brightness at the edge portion of an effective display area when a light guide plate smaller than an effective display area of a liquid crystal panel is used and obtaining high-definition image.

According to the present invention, a backlight unit includes a light source and a light guide plate which guides light from the light source to liquid crystal panel and light is emitted from light emission plane of the light guide plate opposite to the liquid crystal panel toward the liquid crystal panel. An area of the light emission plane of the light guide plate is smaller than an effective display area of the liquid crystal panel and a predetermined shape to diffuse or disperse light is formed in at least one place on a side (edge surface or lateral side) perpendicular to the light emission plane of the light guide plate and/or at an edge portion near the lateral side of the light emission plane.

The predetermined shape is optical pattern formed on the lateral side or at the edge portion of the light guide plate. The optical pattern may be formed by blasting or may be minute prism shape or cylindrical lens shape. Further, the predetermined shape may be taper shape.

Moreover, a reflection member for reflecting light emitted from the lateral side of the light guide plate on the liquid crystal panel may be disposed between the lateral side of the light guide plate and a side of chassis supporting the light guide plate from rear side thereof.

In addition, the center part of the effective display area and the center part of the light guide plate are relatively shifted from each other in consideration of emission direction of light from light emitting diodes.

According to the present invention, even when size of light guide plate is smaller than effective display area of liquid crystal panel, the edge portions or periphery of the effective display area of the liquid crystal panel can be supplied with light by optical pattern formed on the edge surface (lateral side) or at the edge portion of light guide plate and accordingly unevenness in brightness (reduction in brightness) at the edge portions of effective display area can be reduced.

Other objects, features and advantages of the invention will become apparent from the following description of the embodiments of the invention taken in conjunction with the accompanying drawings.

DESCRIPTION OF THE EMBODIMENTS

Embodiments of the present invention are now described with reference to the accompanying drawings. The same numerals are given to elements having the same function of constituent elements appearing in the drawings and duplicated description thereof is omitted.

Embodiment 1

Figure 1:
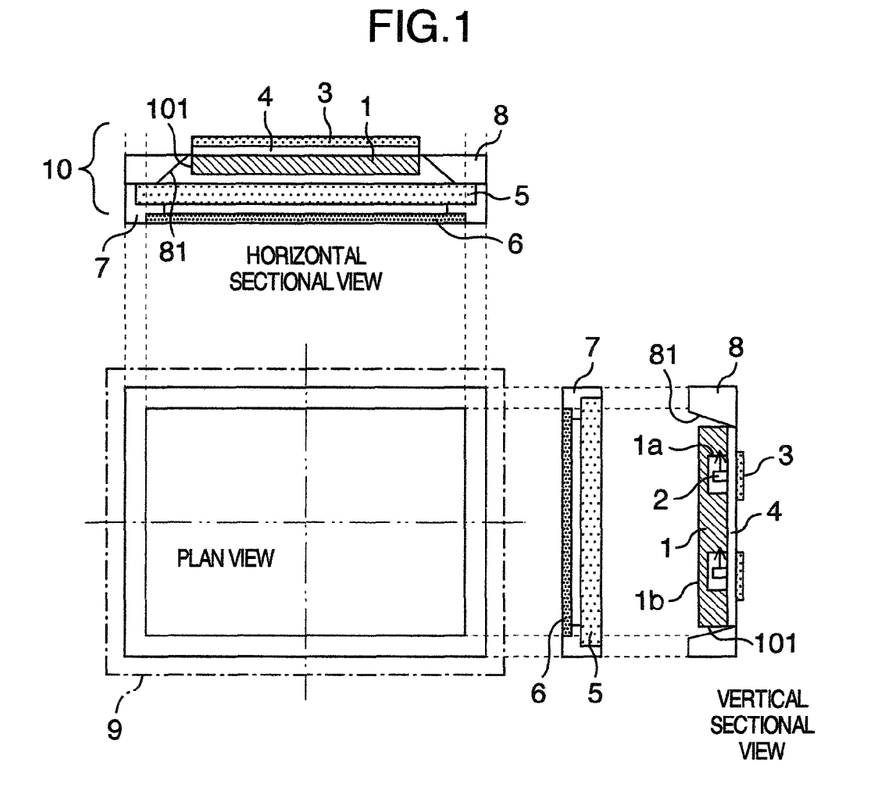
FIG. 1 is a schematic diagram illustrating a liquid crystal display according to a first embodiment of the present invention.

FIG. 1 is a schematic diagram illustrating a liquid crystal display 9 according to a first embodiment. In FIG. 1, the liquid crystal display 9 is illustrated in a plan view, a horizontal sectional view and a vertical sectional view. The liquid crystal display 9 includes a backlight part 10 and a liquid crystal panel 6. The backlight part 10 includes a plate-like light guide plate 1, light emitting diodes (LED's) 2 constituting light source, LED substrates 3, a reflection sheet 4, an optical sheet 5, a liquid crystal panel supporting part 7 and an optical sheet supporting part 8. Elements constituting the backlight part 10 are received in a metallic chassis not shown of box type, for example, to be fixed. A plane of light guide plate 1 opposite to liquid crystal panel 6 is set to be light emission plane 1b and the opposite side thereto (plane on which LED substrate 3 is disposed) of light guide plate 1 is set to be the rear.

Grooves for receiving light emitting diodes 2 are formed in the rear of light guide plate 1 and the side of groove opposite to light emission plane of light emitting diode 2 is light incidence plane 1a. The light emitting diodes 2 use side-view type (side-emission type) light emitting diodes which emit white light in parallel direction to electrode surface and in the embodiment emit light in direction of arrow. Light emitted from light emitting diodes 2 enters light guide plate 1 from light incidence plane 1a and is reflected, refracted or diffused by each side of light guide plate 1 while travels in light guide plate 1, so that the light is emitted from light emission plane 1b of light guide plate 1 toward liquid crystal panel 6. Light emitted from light emission plane 1b passes through optical sheet 5 containing, for example, diffusion plate, prism sheet and brightness improvement sheet to irradiate liquid crystal panel 6. The liquid crystal panel 6 is supplied with image signal to control transmissivity of each pixel (liquid crystal pixel) in accordance with image signal, so that light from optical sheet 5 is modulated for each pixel spatially to form image.

Optical pattern of zigzag, for example, is formed on light emission plane 1b in order to uniform emitted light spatially. The optical pattern on light emission plane may be minute uneven (undulated) shape or dot-pattern printed by white ink, for example. Further, uneven shape may be formed by laser processing or may be made using mold.

Reflection sheet 4 is disposed on the rear of the light guide plate 1 opposite to the light emission plane 1b and has the function of reflecting light which passes through the rear of light guide plate 1 and travels outside of light guide plate 1 and returning the light to the inside of light guide plate 1. Light emitting diodes 2 mounted on LED substrates 3 are received in grooves of light guide plate 1 through holes of reflection sheet 4. At this time, reflection sheet 4 is disposed between LED substrates 3 and light guide plate 1. In this example, LED substrates 3 are attached on the rear of light guide plate 1 so as to sandwich reflection sheet 4 between LED substrates 3 and light guide plate 1. Holes of reflection sheet 4 may be larger than the size of light emitting diodes.

Optical sheet supporting part 8 is disposed on 4 sides of up and down, left and right of light guide plate 1 and is formed with taper spreading toward liquid crystal panel 6 from the rear of light guide plate 1. With such structure, optical sheet supporting part 8 supports optical sheet 5 from rear side thereof to suppress distortion of optical sheet 5 and keeps distance between light guide plate 1 and optical sheet 5 fixed. Reflection elements 81 are disposed integrally with optical sheet supporting part 8 or separately at places where taper of optical sheet supporting part 8 is formed to reflect light emitted from sides of light guide plate 1 toward the front (side of liquid crystal panel 6). Accordingly, reflection element 81 may be formed by using material having high reflectivity in taper part of optical sheet supporting part 8 locally or by affixing reflection sheet on taper part to increase reflectivity. It is a matter of course that all the optical sheet supporting part 8 may be formed by using material having high reflectivity.

The kind of material of optical sheet 5 may be changed to use diffusion sheet, prism sheet or the like and the number of optical sheets may be changed in response to effects desired to get. Liquid crystal panel supporting part 7 is disposed to support optical sheet 5 from the liquid crystal panel 6 side and to put optical sheet 5 between optical sheet supporting part 8 and liquid crystal panel supporting part 7. Further, optical sheet supporting part 8 and liquid crystal panel supporting part 7 are in partial contact with each other and are fixed together with optical sheet 5 by screwing method or the like. Liquid crystal panel supporting part 7 supports liquid crystal panel 6 from the back thereof and abuts against side of liquid crystal panel 6 to position liquid crystal panel 6. In vertical sectional view of FIG. 1, optical sheet 5, liquid crystal panel supporting part 7 and liquid crystal panel 6 are shown to be separated from optical sheet supporting part 8 for the convenience of explanation, although the above elements are disposed near optical sheet supporting part 8 actually in the same manner as horizontal sectional view.

In the embodiment, it is supposed that effective display area of liquid crystal panel 6 is 46 inches, for example, and light guide plate 1 is divided into plural light guide plate blocks. It is also supposed that the size of each light guide plate block is decided on the basis of 52-inch size. That is, in the embodiment, light guide plate block having the same size is used in common to 46 and 52 inches to reduce development man-hours and cost. Accordingly, area of light emission plane 1b of light guide plate 1 (formed by combining all of light guide plate blocks) is smaller than effective display area of liquid crystal panel 6 as described in FIG. 9.

Figure 2:
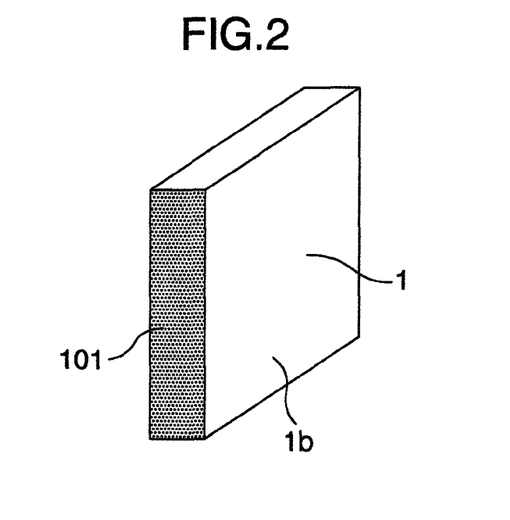
FIG. 2 is a perspective view showing a shape of a light guide plate 1 according to the first embodiment of the present invention.

FIG. 2 shows a shape of light guide plate 1 according to the embodiment which is applied to device having structure as described above.

When the size of light emission plane 1b of light guide plate 1 is smaller than effective display area of liquid crystal panel 6, it is difficult to supply light to the edge portion of effective display area as described above, so that brightness at the edge portion of effective display area is reduced. In order to solve the problem, in the embodiment, predetermined optical pattern is provided on an edge surface (lateral side) of light guide plate 1, that is, a side perpendicular to light emission plane 1b (or rear plane) of light guide plate 1. In the embodiment, the optical pattern is formed by rough plane 101 in which minute unevenness (undulation) is formed at random. The rough plane 101 can be formed by blasting or matting the lateral side of light guide plate 1, for example. When light guide plate 1 or light guide plate blocks are formed using mold, rough pattern may be formed in a part of the mold corresponding to the lateral side of light guide plate 1. Further, the degree of roughening may be changed according to a place (location) of the lateral side of light guide plate 1. For example, since light intensity is strong near light emitting diodes 2 on the lateral side of light guide plate 1, the edge surface (lateral side) is not excessively roughened (that is, reduce density of minute unevenness) and roughening may be enhanced (that is, increase density of minute unevenness) as the place (location) is away from the light emitting diodes 2 in light emission direction (in the direction of arrow of FIG. 1). Such roughening is performed to emit light uniformly from the lateral side of the light guide plate 1.

Figure 3:
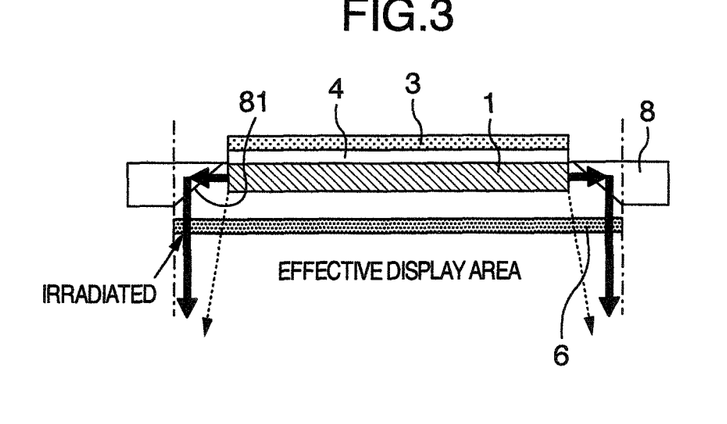
FIG. 3 is a horizontal sectional view illustrating effects of the first embodiment.

FIG. 3 shows effects of the first embodiment, that is, effects obtained by forming the lateral side of light guide plate 1 into the rough plane 101. Light entering the light guide plate 1 from the light emitting diodes 2 is diffusely reflected by rough plane 101 formed on the lateral side of the light guide plate 1 and is emitted from the lateral side of light guide plate 1 outside. The emitted light is reflected by reflection elements 81 disposed on inclined plane of optical sheet supporting part 8 and travels toward liquid crystal panel 6. Accordingly, reduction in brightness at the edge portion of the effective display area can be prevented as shown in FIG. 3 and unevenness in brightness can be reduced. In other words, in the embodiment, the light emission area of the light from the light guide plate 1 can be extended.

The taper angle of optical sheet supporting part 8 may be changed according to area of light guide plate 1 or effective display area of liquid crystal panel 6 or distance from the side of light guide plate 1 to the side of liquid crystal panel 6 opposite to the side of light guide plate 1 or may be changed properly according to emission direction of light.

According to the embodiment, since predetermined optical pattern (rough plane 101) is formed on the lateral side of light guide plate 1, reduction in brightness at the edge portion of the effective display area of liquid crystal panel 6 can be prevented even if light guide plate 1 smaller than effective display area of liquid crystal panel 6 is used. Therefore, according to the embodiment, reduction in brightness at the edge portion of effective display area of liquid crystal panel 6 caused by using light guide plate 1 having common size to plural inch sizes can be prevented while development man-hours and cost are reduced by using light guide plate 1 having common size to plural inch sizes, for example, and image with high picture quality can provided.

In the embodiment, light emitting diodes 2 emit white light, although light emitting diodes which emit three colors of red, blue and green may be used instead. Further, top-view type light emitting diodes may be used instead of side-view type light emitting diodes.

Embodiment 2

The second embodiment has the same structure as that of the first embodiment except shape of light guide plate 1 and accordingly only shape of light guide plate of the second embodiment is described below.

Figure 4:
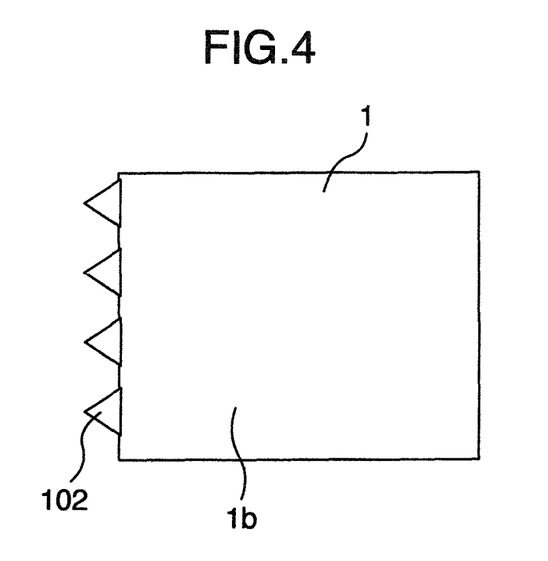
FIG. 4 is a plan view showing a shape of a light guide plate 1 according to a second embodiment of the present invention.

FIG. 4 shows shape of light guide plate 1 according to the second embodiment. In the embodiment, prisms 102 are disposed on an edge surface (lateral side) of light guide plate 1 as optical pattern. The prisms 102 disposed on the lateral side of light emitting diodes 2 near the light emitting diodes 2 and those disposed in place apart from light emitting diodes 2 in emission direction (in arrow direction of FIG. 1) of light from light emitting diodes may have shape changed to vary degree of light condensation, similarly to the first embodiment. For example, density of prisms may be decreased in the vicinity of light emitting diodes 2 (pitch between prisms 102 is lengthened) and may be increased in place apart from light emitting diodes (pitch between prisms 102 is shortened). Further, prism angle disposed on side of light emitting diodes near light emitting diodes 2 may be different from that in place apart from light emitting diodes 2 in emission direction of light from light emitting diodes 2, that is, angle of prisms near light emitting diodes 2 may be made larger and angle of prisms distant from light emitting diodes 2 may be made smaller.

An edge surface ("lateral side") of the light guide plate 1 can be formed in the shape of the prisms 102 described above, so that light emitted from the lateral side of light guide plate 1 can be condensed or concentrated by prisms 102 and spread outward from the lateral side of light guide plate 1. Accordingly, even when light which travels in light guide plate 1 and reaches the lateral side of light guide plate 1 is weak, the light can be condensed by shape of the prisms 102 and sent outside from the lateral side of the light guide plate 1 suitably. Therefore, according to the embodiment, reduction in brightness at the edge portion of effective display area in case where light emission plane of light guide plate 1 is smaller than effective display area of liquid crystal panel 6 can be suppressed to reduce unevenness in brightness.

In the embodiment, the edge surface (lateral side) of the light guide plate 1 is formed with prisms, although it is not limited thereto and the edge surface of the light guide plate 1 may be formed with plural cylindrical lenses projecting outside of light guide plate 1 and extending lengthwise in direction parallel to thickness direction of light guide plate 1 (that is, in direction perpendicular to light emission plane 1*b*), for example.

Embodiment 3

The third embodiment has the same structure as that of the first embodiment except shape of light guide plate 1 and accordingly only shape of light guide plate of the third embodiment is described below.

Figure 5:
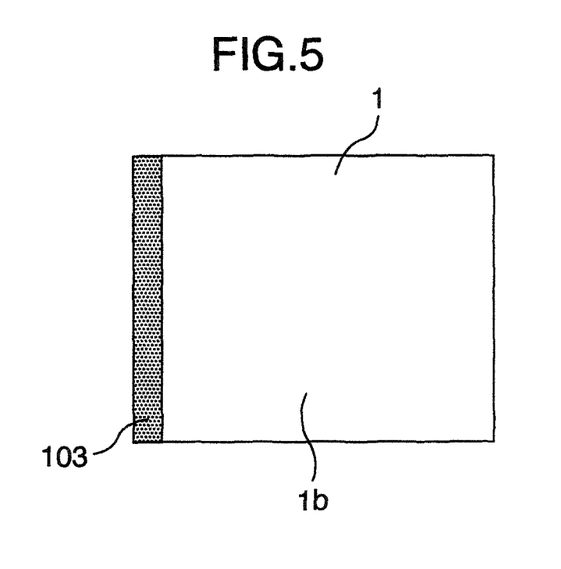
FIG. 5 is a plan view showing a shape of a light guide plate 1 according to a third embodiment of the present invention.

FIG. 5 shows shape of light guide plate 1 according to the third embodiment. In the embodiment, rough plane 103 having minute unevenness (undulation) formed at random is formed at an edge portion of the light emission plane 1*b* near a lateral side of light guide plate 1 as the predetermined optical pattern.

Rough plane 103 is formed at the edge portion of light emission plane 1*b* near a lateral side of light guide plate 1 and in addition thereto rough plane 103 may be formed even on the edge surface ("lateral side") of the light guide plate 1 or rough plane 103 may be formed only at the edge portion. For example, rough plane 103 may be formed with lenses formed on light emission plane 1*b* near a lateral side of light guide plate 1 or rough plane 103 may be formed by blasting or matting or rough plane 103 may be formed by printing dot-pattern by white ink. Rough plane 103 may be formed by any method as far as the same effects as the embodiments 1 and 2 are obtained.

Similarly to the embodiments 1 and 2, shape of rough plane 103 at light emission plane 1*b* of light guide plate 1 near light emitting diodes may be different from that in place apart from light emitting diodes. For example, density of unevenness may be decreased in the vicinity of light emitting diodes since light intensity is strong and density of unevenness may be increased in place apart from light emitting diodes in light emission direction.

The edge portion of the light emission plane 1*b* near the lateral side of light guide plate 1 can be roughened as described above, so that light can be spread outward from the lateral side of light guide plate 1. Therefore, according to embodiment, reduction in brightness at the edge portion of the effective display area of liquid crystal panel 6 in case where light emission plane of light guide plate 1 is smaller than effective display area of liquid crystal panel 6 can be suppressed to reduce unevenness in brightness.

Embodiment 4

Figure 6:
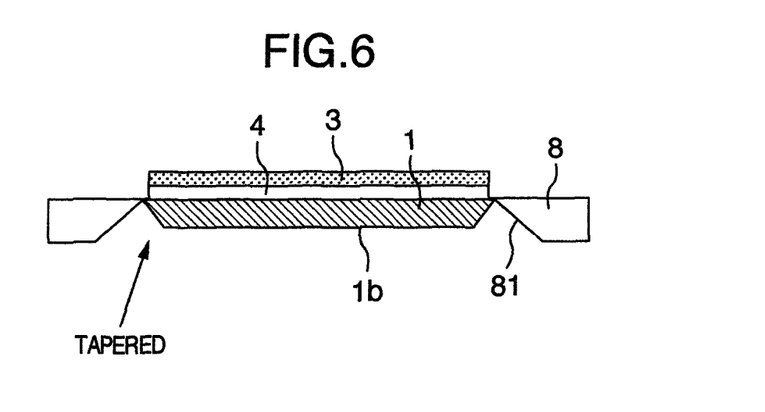
FIG. 6 is a sectional view showing a shape of a light guide plate 1 according to a fourth embodiment of the present invention.

The fourth embodiment has the same structure as that of the first embodiment except shape of light guide plate 1 and accordingly only shape of light guide plate of the fourth embodiment is described below. FIG. 6 is a horizontal sectional view of the liquid crystal display 9 of FIG. 1 and shows shape of light guide plate 1 according to the fourth embodiment. The light guide plate 1 according to the fourth embodiment has taper formed at an edge portion of light guide plate 1. This taper is formed so that area of light emission plane 1*b* is narrowed toward liquid crystal panel 6 from reflection sheet 4, that is, this taper has taper direction opposite to that of optical sheet supporting part 8.

When such taper is provided in light guide plate 1, light can be easily emitted from the side of light guide plate 1 and can be spread outward from side of light guide plate 1. Therefore, according to the embodiment, reduction in brightness at the edge portion of the effective display area of liquid crystal panel 6 in case where light emission plane of light guide plate 1 is smaller than effective display area of liquid crystal panel 6 can be suppressed to reduce unevenness in brightness.

It is a matter of course that a lateral side (edge surface) of the light guide plate 1 may be formed with the rough plane of the first embodiment or prisms or lenses of the second embodiment or a rough plane may be formed at an edge portion of the light emission plane 1*b* near the lateral side of the light guide plate 1 as in the third embodiment in addition to the taper formed at the edge portion of the light guide plate 1.

Embodiment 5

Figure 7:
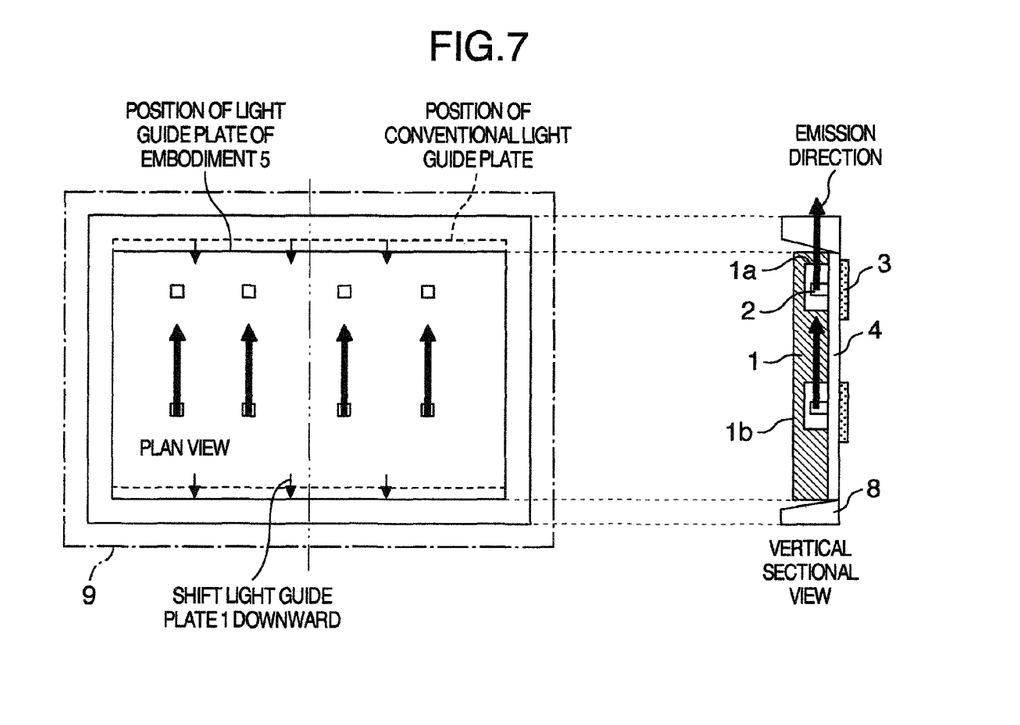
FIG. 7 is a schematic diagram illustrating a liquid crystal display according to a fifth embodiment of the present invention.

Referring now to FIG. 7, the fifth embodiment of the present invention is described. FIG. 7 shows a plan view and vertical sectional view of the liquid crystal display 9 according to the fifth embodiment.

In the liquid crystal display 9, as shown by arrows in FIG. 7, light emission direction of light emitting diodes 2 corresponds to direction of light incident on light incidence plane 1*a* of light guide plate, that is, light is emitted upward of the picture and accordingly light is apt to be emitted upward of the picture and light is hard to be emitted downward of the picture.

Accordingly, in the fifth embodiment, light guide plate 1 is not disposed in the center of the picture and is shifted (displaced) downward of the picture. That is, light guide plate 1 is disposed so that center of light guide plate 1 is positioned at lower side than center of effective display area of liquid crystal panel 6. By shifting light guide plate 1 to the lower side as described above, even when light emitted from the lower side of the picture screen is weak, reduction in brightness at the edge portion of effective display area at the lower side can be decreased. Furthermore, it is a matter of course that the first to fourth embodiments can be combined to suppress reduction in brightness and reduce unevenness in brightness.

For example, since upper corners of the picture are most distant from light guide plate 1, upper lateral side of light guide plate 1 is gradually roughened so that roughness is reduced from corners to center in order to irradiate upper part of the picture. Alternatively, prisms may be provided at short pitch near corners of upper lateral side of the light guide plate 1 and at long pitch in the center of the upper lateral side. In this manner, shape of optical pattern on upper side of light guide plate 1 is different, so that unevenness in brightness can be reduced more preferably.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A backlight unit including a light source and a light guide plate which guides light from the light source to a liquid crystal panel, light being emitted from a light emission plane of the light guide plate opposite to the liquid crystal panel toward the liquid crystal panel, wherein an area of the light emission plane of the light guide plate is smaller than an effective display area of the liquid crystal panel, a predetermined shape to diffuse or disperse light is formed on a lateral side perpendicular to the light emission plane of the light guide plate and/or at an edge portion near the lateral side of the light emission plane, and reflection elements having shapes spreading from a rear side of the light guide plate toward the liquid crystal panel are disposed at positions opposite to sides of the light guide plate, and the reflection elements are configured to reflect light emitted from the sides of the light guide plate toward the liquid crystal panel.

2. A backlight unit according to claim 1, wherein the predetermined shape is optical pattern to diffuse or disperse light.

3. A backlight unit according to claim 2, wherein the optical pattern is formed by rough plane having minute unevenness.

4. A backlight unit according to claim 3, wherein a density of the minute unevenness of the rough plane near the light source is different from that apart from the light source in emission direction of light from the light source.

5. A backlight unit according to claim 2, wherein the optical pattern is formed by prisms.

6. A backlight unit according to claim 5, wherein a pitch between the prisms near the light source is different from that apart from the light source in emission direction of light from the light source.

7. A backlight unit according to claim 5, wherein an angle of the prisms near the light source is different from that apart from the light source in emission direction of light from the light source.

8. A backlight unit according to claim 1, wherein the predetermined shape is taper shape formed at the edge portion near the lateral side of the light emission plane of the light guide plate.

9. A backlight unit according to claim 1, wherein a center position of the light guide plate is different from a center position of the liquid crystal panel.

10. A backlight unit according to claim 1, wherein a center of the light guide plate is positioned in a lower side of picture screen than a center of the liquid crystal panel.

11. A backlight unit according to claim 1, wherein the light source comprises light emitting diodes.

12. A backlight unit including a light source and a light guide plate which guides light from the light source to a liquid crystal panel, light being emitted from a light emission plane of the light guide plate opposite to the liquid crystal panel toward the liquid crystal panel, wherein
an area of the light emission plane of the light guide plate is smaller than an effective display area of the liquid crystal panel,
an optical pattern to diffuse or disperse light is formed on a lateral side perpendicular to the light emission plane of the light guide plate and/or at an edge portion near the lateral side of the light emission plane, and
reflection elements having shapes spreading from a rear side of the light guide plate toward the liquid crystal panel are disposed at positions opposite to sides of the light guide plate, and the reflection elements are configured to reflect light emitted from the sides of the light guide plate toward the liquid crystal panel.

13. An image display comprising the backlight unit according to claim 1.

14. An image display comprising the backlight unit according to claim 12.

* * * * *